United States Patent [19]
Lawlor

[11] 3,942,155
[45] Mar. 2, 1976

[54] SYSTEM FOR PACKING PAGE FRAMES WITH SEGMENTS

[75] Inventor: Francis Daniel Lawlor, Hyde Park, N.Y.

[73] Assignee: International Business Machines Corporation, Armonk, N.Y.

[22] Filed: Dec. 3, 1973

[21] Appl. No.: 421,707

[52] U.S. Cl. .................................. 340/172.5
[51] Int. Cl.² ................................ G06F 13/00
[58] Field of Search ...................... 340/172.5

[56] References Cited
UNITED STATES PATENTS

| | | | |
|---|---|---|---|
| 3,412,382 | 11/1968 | Couleur et al. | 340/172.5 |
| 3,425,039 | 1/1969 | Bahrs et al. | 340/172.5 |
| 3,510,847 | 5/1970 | Carlson et al. | 340/172.5 |
| 3,614,746 | 10/1971 | Klinkhamer | 340/172.5 |
| 3,764,996 | 10/1973 | Ross | 340/172.5 |

Primary Examiner—Joseph M. Thesz, Jr.
Attorney, Agent, or Firm—Bernard M. Goldman

[57] ABSTRACT

Provides apparatus for partitioning page frame hardware components of a main store into four partitions. The apparatus can pack small fixed size segments into each of the four partitions and can pack the first part of a large segment, or a varying-size segment into the last partition of a page frame. Hardware is disclosed for executing a create segment instruction which will pack its created segment into the same page frame with a specified existing segment. The apparatus also generates and updates a header for any page frame which is to contain a plurality of segments. The embodiment comprises comparators, registers, and their connecting gating hardware for generating the electrical signals which create the segments and page frame headers.

Other hardware modifies each address in order for it to access a required partition with a selected page frame. Still other apparatus checks the upper bound of a partition containing the pertinent segment to determine that the address will not access into the next partition in the page frame, prior to the address accessing of main store. An error condition is generated if the address exceeds its segment's partition.

12 Claims, 21 Drawing Figures

FIG.1D
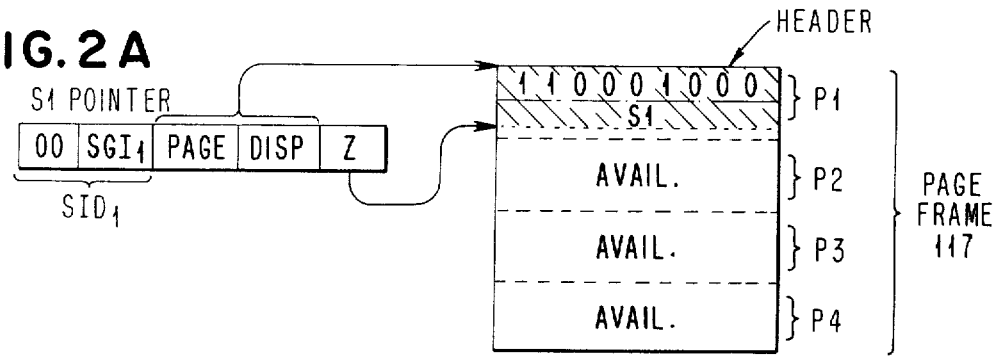
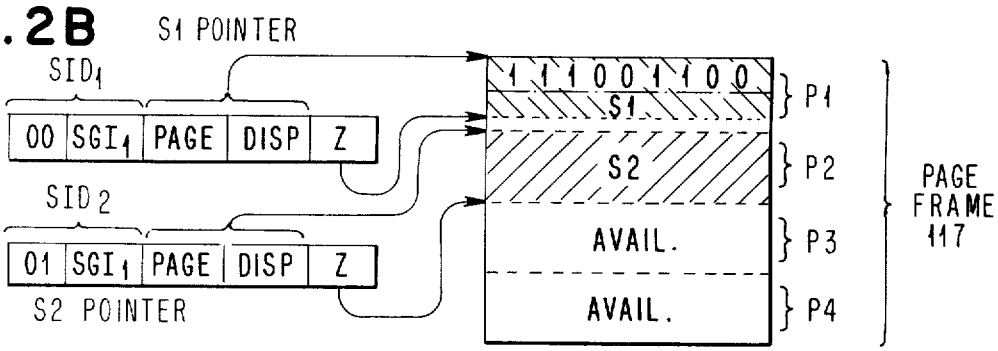
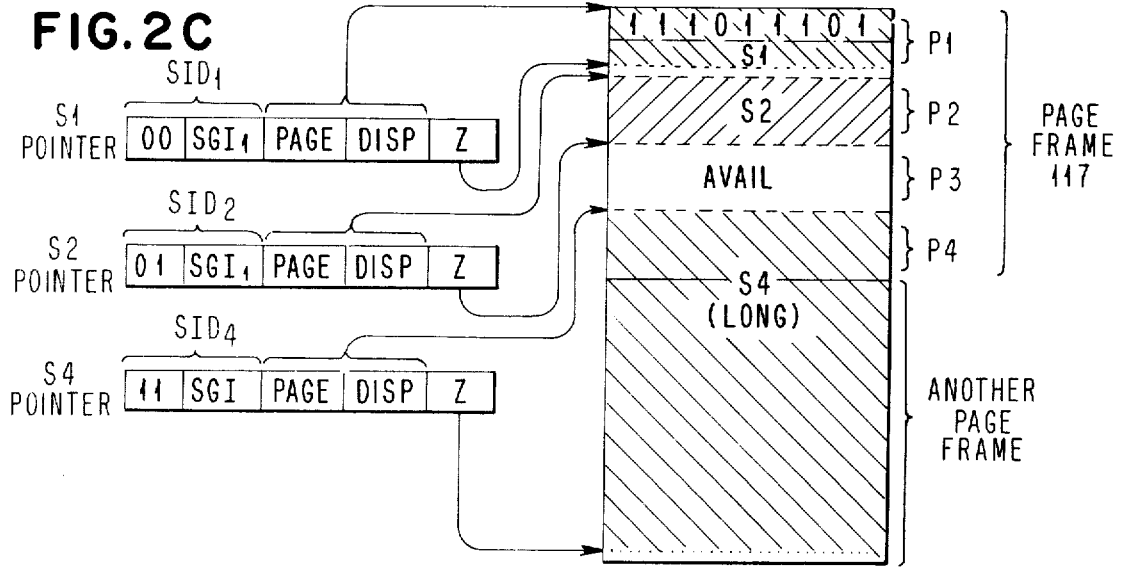

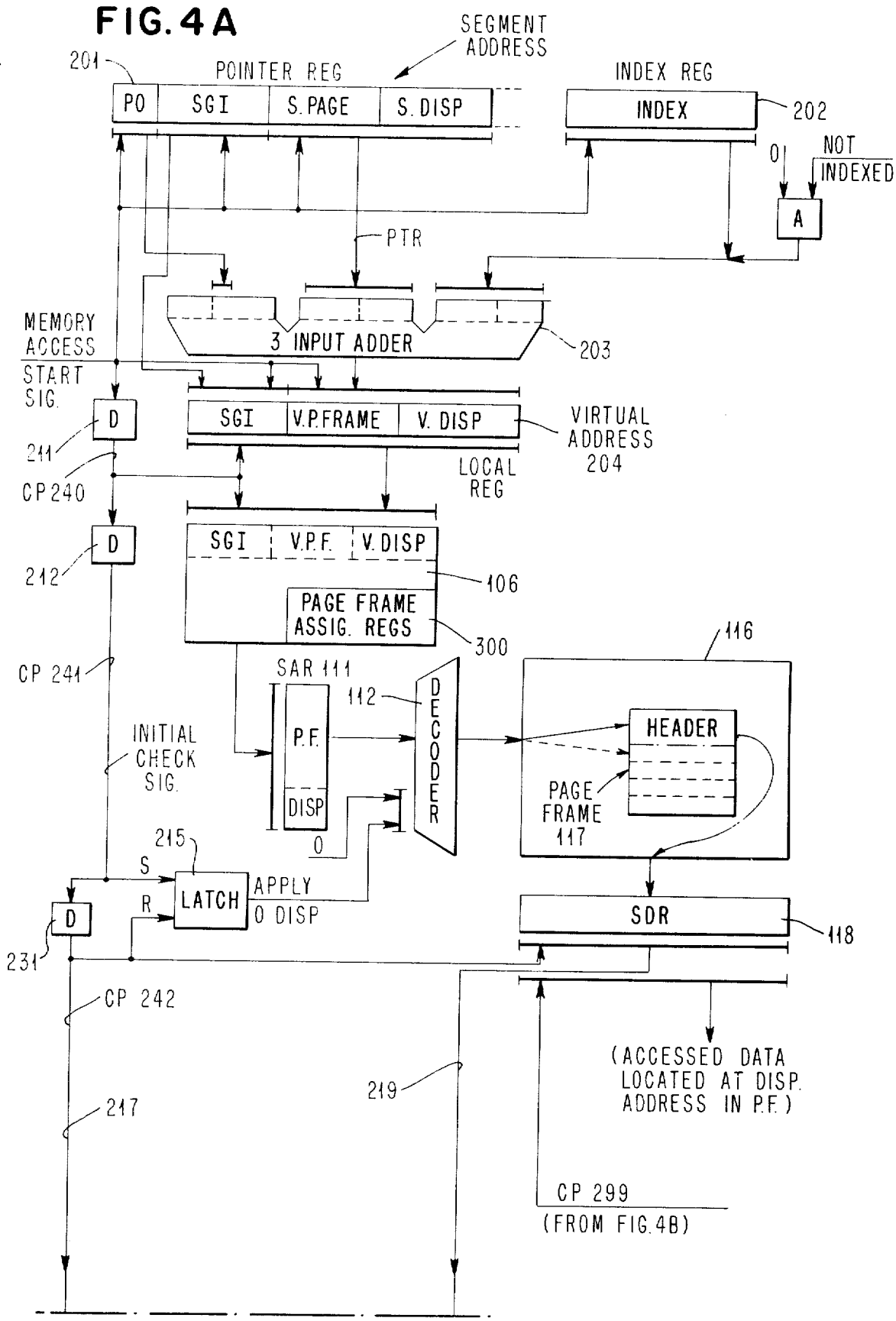

FIG. 5
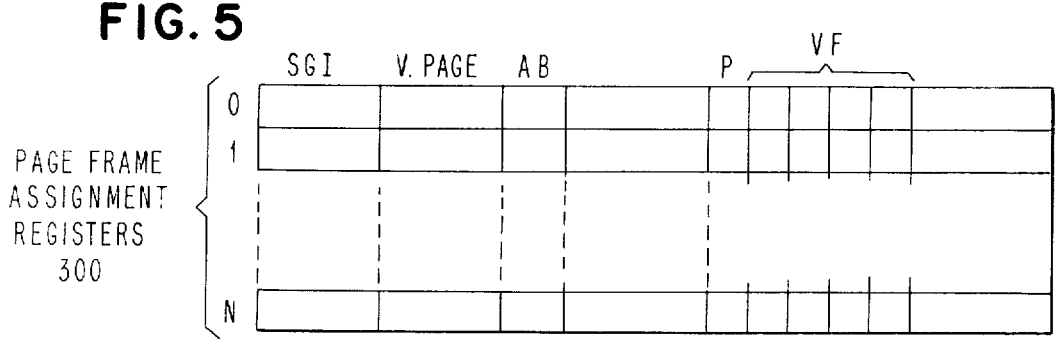
FIG. 6A
FIG. 6B
FIG. 7A PACKABLE SEGMENT ADDRESS
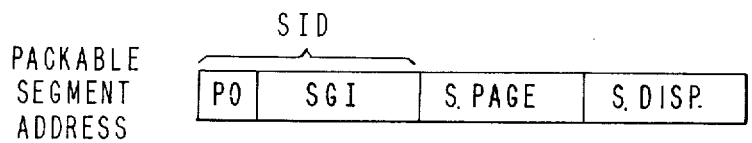
FIG. 7B
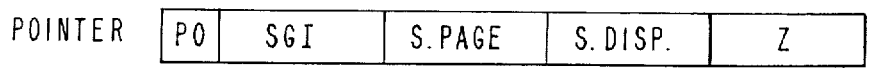
FIG. 7C
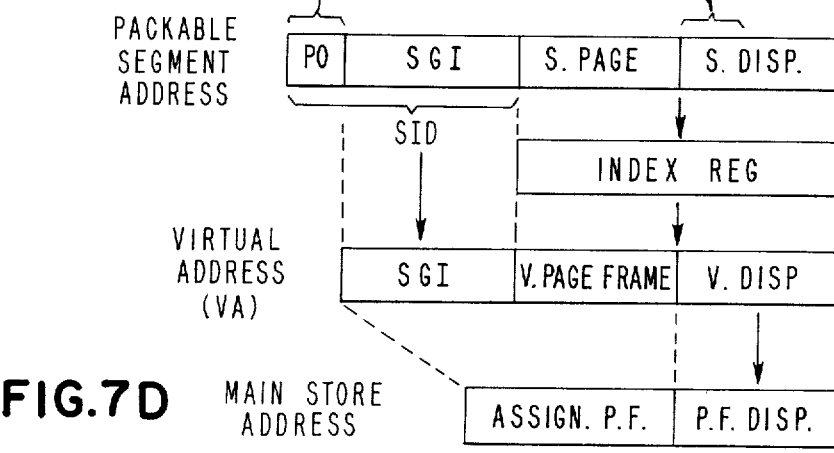
FIG. 7D

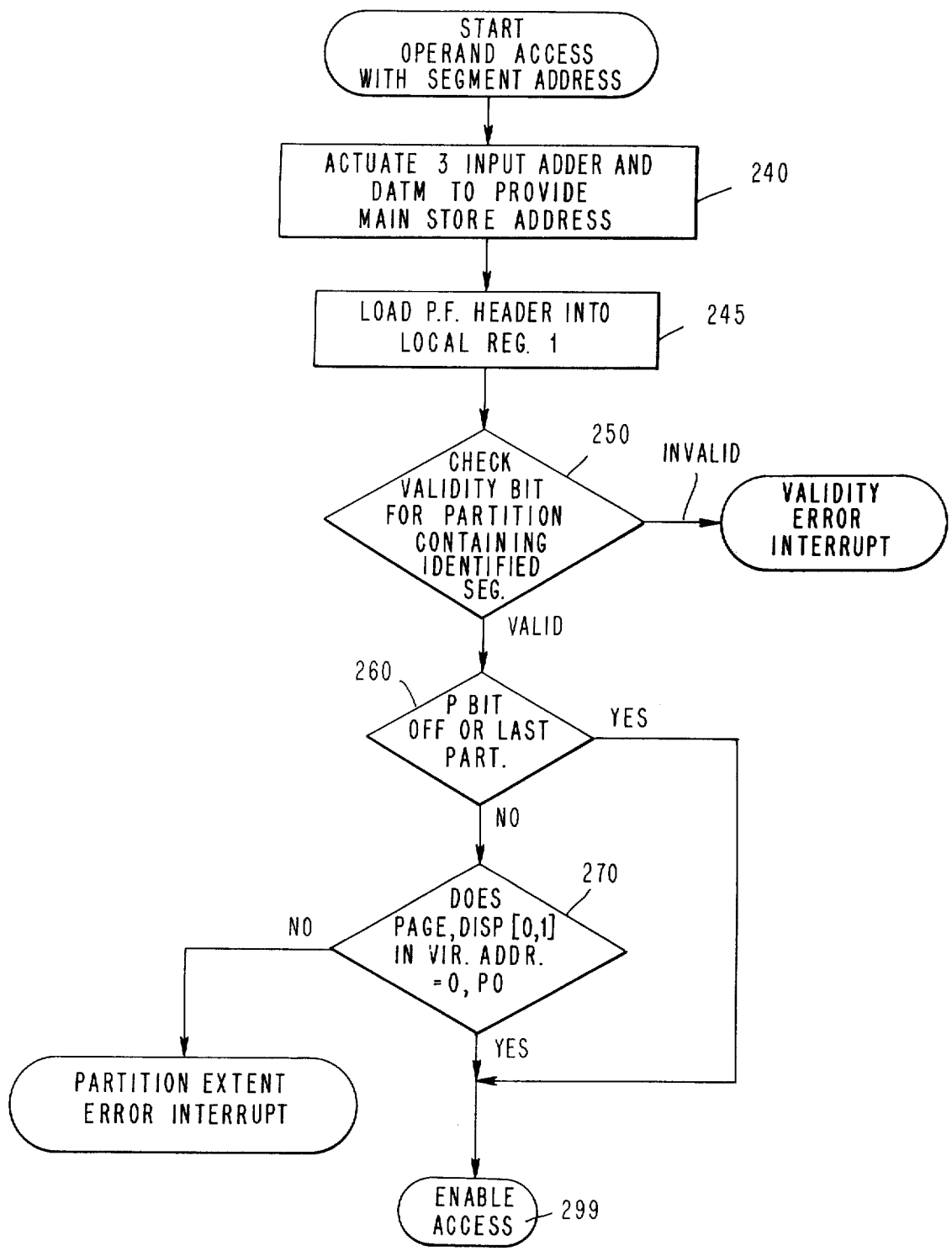
FIG. 9 (OPERATION OF CIRCUITS IN FIGS. 4A & 4B)

SYSTEM FOR PACKING PAGE FRAMES WITH SEGMENTS

BACKGROUND OF THE INVENTION

This invention relates to a mechanism for packing plural segments into a page freme within a computer main store. The computer store includes main store and devices external to main store which may be called input/output or source/sink devices. Computer store is divided into a large number of equal parts called page frames (e.g. 2,048 or 4,096 bytes in size).

A segment is an entity conprising a contiguous range of addressability which is used by the hardware of a computer system for locating data in the store of the system.

Segments may be created in varying sizes, while page frames are fixed in size. Either may have its size measured in bytes. Segments which cannot change their size after their creation are called "fixed" segments, but "varying" segments can have their size changed after their creation. Segment size can vary from a small fraction of a page frame to a very large number of page frames, for example from 0 to $2^{24}$ bytes.

A small segment may be defined as a segment which is less than a predetermined part of a page frame in size, and a large segment is defined as greater than the predetermined part of a page frame in size.

Fundamentally the wide range of segment sized is incompatible with the fixed page size. Yet segments, or parts of segments, must be put into page frames before the segments can be used by executing programs. A potentially high wastage of main store use can result from this incompatability, since a segment may be so small as to occupy only a small part of a page frame, with the result that most of the space in the page frame is unused.

If the segment is large it may occupy a large number of page frames in which case the segment may be divided into a number of pages each being transferrable into a page frame hardware unit in the main store. Large segments are therefore relatively compatible with page frames because only the last page of a segment may leave unused space in a segment; hence large segments result in low waste.

This invention is directed primarily at reducing the size incompatibility between page frames and small segments, although it consistently handles all sizes of segments whether they are small or large, fixed or variable. The invention does this by supporting the packing of plural segments into a singel page frame. Page frame packing includes putting only plural fixed small segments into a page frame, or putting into a page frame plural fixed small segments with a whole or part of a varying segment or a part of a large segment.

The invention can greatly improve the efficiency in the system use of main store by providing a broad solution to the basic incompatibility between fixed small segments and the main store's page frame size.

The invention also supports the accessing of data in a segment which may begin at any of plural partitions provided in a page frame. The invention is interfaced with a segmented virtual addressing system in a way that provides access to any byte in any segment in a consistent manner whether or not the access is to packed or unpacked page frames.

Segmented addressing conventionally uses the address format shown in FIG. 6A to locate any byte in any segment, although the addressing format in FIG. 6A excludes the use of this invention. FIG. 6A shows a segment address which contains a SID (Segment Identifier) field which identifies the segment, a page field for locating a page in the segment, a displacement (DISP) field which is the byte offset for locating any byte within the page. The page and displacement fields together provide a byte offset in the segment to any addressed byte. Whenever any byte in any segment is to be accessed with this segment address, a dynamic address translation mechanism (DATM) in the central processing unit performs the task of assigning a page frame to receive the page of the segment containing that byte. This assignment process assigns any available page frame in main store to the segment identifier and page fields in the segment address to form the assigned page frame field in the main store address shown in FIG. 6B. Thereafter the assigned page frame is substituted by DATM for the segment identifier and page field to provide the main store address of the byte, as shown in FIG. 6B. DATM puts the same displacement field in the main store address that it is given in the segment address.

When the addressing shown in FIGS. 6A and 6B is used, only a single segment may be assigned by the system to a page frame in the main store, which can result in most of the space in the page frame being wasted if the segment is small. For example, a segment which is a few hundred bytes in size may be the only segment in a page frame that is 4,096 bytes in size, resulting in over 3,000 bytes of hardware being unused in main store; this is highly inefficient. Of course, the user can put his data into parts of segments rather than in separate segments, but this throws a segment management burden on the user which he is often not equipped to handle. Putting several small data objects into parts of a single segment which occupies one or more page frames, would eliminate small segments, but then the user would have to provide his own "lookaside" directory for these packed data objects to locate them in each segment and provide all of the storage allocation overhead and management that this directory scheme would entail. The result burdens the user by making the system more difficult to use. To simplfy his use of the system, the user would ordinarily not attempt to combine unrelated small data objects into the same segment, and he would simply put each of them in a different segment, in order to be able to use automatic storage allocation features and automatic segment protection features provided in the system.

Making the page size smaller to approximate the size of the smallest segments, however, is also an undesirable design approach, since small page frame sizes may seriously impact the system hardware performance. This is because the system overhead for page handling increases rapidly as the page frame size is decreased. In general the overhead increases by a power of two each time the number of page frames is doubled. This dilemma may be referred to as the "small segment" problem.

BRIEF SUMMARY OF THE INVENTION

The invention provides a mechanism which supports the automatic packing segments into page frames. Both small and large segments can be packed. Small fixed-size segments are packed by putting more than one into a page frame. A large segment is packed when an initial part of the large segment is put into a page frame which has or can receive one or more fixed small segments. A varying size segment, whether small or large, is packed when it is put into a page frame which has or can receive one or more fixed small segments. The mechanism contains a unique addressing system that supports both packed and unpacked page frames in the same manner. As a result, the page frame size can be made relatively large, and yet be compatible with small segments in order to both minimize main storage waste and to keep down system page handling overhead by permitting any page frame to contain plural segments. This approach eliminates the need for: (1) special lookaside directories and their accompanying overhead for the handling of packed pages, (2) user-provided segment storage allocation features, and (3) user-provided protection features for data objects within segments. The invention permits these objectives to be automatically provided by the system with their supporting features, whereby the user can obtain their advantages without being bothered with them.

FIG. 7A shows a packable segment address which is used by the apparatus in a described embodiment of this invention. The form of the address in FIG. 7A has much similarity to that shown in FIG. 6A. In FIG. 7A a packing offset (PO) field and an SGI field together comprise an SID field of the type shown in FIG. 6A. The PO field locates a partition in a page frame of the type shown in FIG. 8. A partition can contain a segment identified by a SID.

FIG. 7C shows the metamorphosis involved in changing the form of the packable segment address into a virtual address form by the apparatus in the described embodiment. The PO bits are summed with the two highest order bits in the segment displacement field, and the resultant page and displacement fields are summed with the content of an index register, if provided. The final result is the virtual address (VA) which contains a virtual page frame field (V. Page Frame or V.P.F.) and a virtual displacement field (V. DISP.). The V. page frame has boundaries which align with assignable page frames in main store. The V. DISP. field locates any byte in the V. page frame. When packing is done, the V. Page frames do not align with the segment pages (S. pages); their alignment relationship can be seen in the example shown in FIG. 7E. The VA is changed to a main store address shown in FIG. 7D by a dynamic address translation mechanism (DATM), which assigns a page frame to the SGI and virtual page frame fields provided by the virtual address. The page frame (P.F.) displacement field in FIG. 7D is the same as the virtual displacement field in FIG. 7C. The assigned page frame and P.F. displacement can then be accessed in the main store. DATM may be conventional and is not part of this invention; for example DATM may be of the type currently found in some commercial computer systems. A described example of a dynamic address translation mechanism (DATM) is found in prior U.S. Pat. No. 3,670,309.

FIG. 8 shows the different partitions used by the described embodiment in a page frame in which a segment may reside when a two bit PO field is used.

BRIEF DESCRIPTION OF THE DRAWINGS

The foregoing and other/objects, features and advantages of the invention will be more apparent from the following more particular description of the preferred embodiments of the invention illustrated in the accompanying drawings of which:

FIGS. 1A, 1B, 1C, 1D and 1E shows apparatus for creating packed and unpacked segments.

FIGS. 2A, 2B and 2C illustrate simple examples of packing segments in a page frame.

FIGS. 4A and 4B illustrate apparatus for checking addresses prior to their completing an access of an operand from a packed segment in a page frame.

FIG. 5 shows page frame assignment registers.

FIG. 6A shows the form of a segment address, and FIG. 6B shows the form of a main store address.

FIGS. 7A, 7B, 7C and 7D illustrate different address forms which are used by the apparatus shown in FIGS. 1A through 1C and in FIGS. 4A and 4B.

FIG. 9 shows the operation of FIGS. 4A and 4B.

FIGS. 1A through 1C show hardware which can be installed in a central processing unit or storage control unit to support the creation of segments by a data processing system. The hardware may be actuated in response to the CPU execution of a create segment command, such as shown in FIG. 1D, which has operands that contain the inputs to the embodiment in FIGS. 1A through 1C. Its operands are as follows:

N: Specifies a pointer register in which will be generated a pointer which indicates the range of addressability for the new segment being created.

Z: Specifies a register which contains the size in bytes of the segment to be created. The segment size may be in the range from 0 to $2^{24} - 1$ bytes.

F/V: Fixed/Variable flag which indicates whether the segment is to have a fixed or varying size (varying segments may have their size modified).

A: Specifies a pointer register containing the specified segment identifier of an affinity segment, which is a previously created segment, with which the new segment (about to be created) is to be packed in the same page frame if possible. The A operand is optional, and is set to zero if no affinity is specified, in which case the new segment will be the only segment put into a page frame.

Figure 1A:
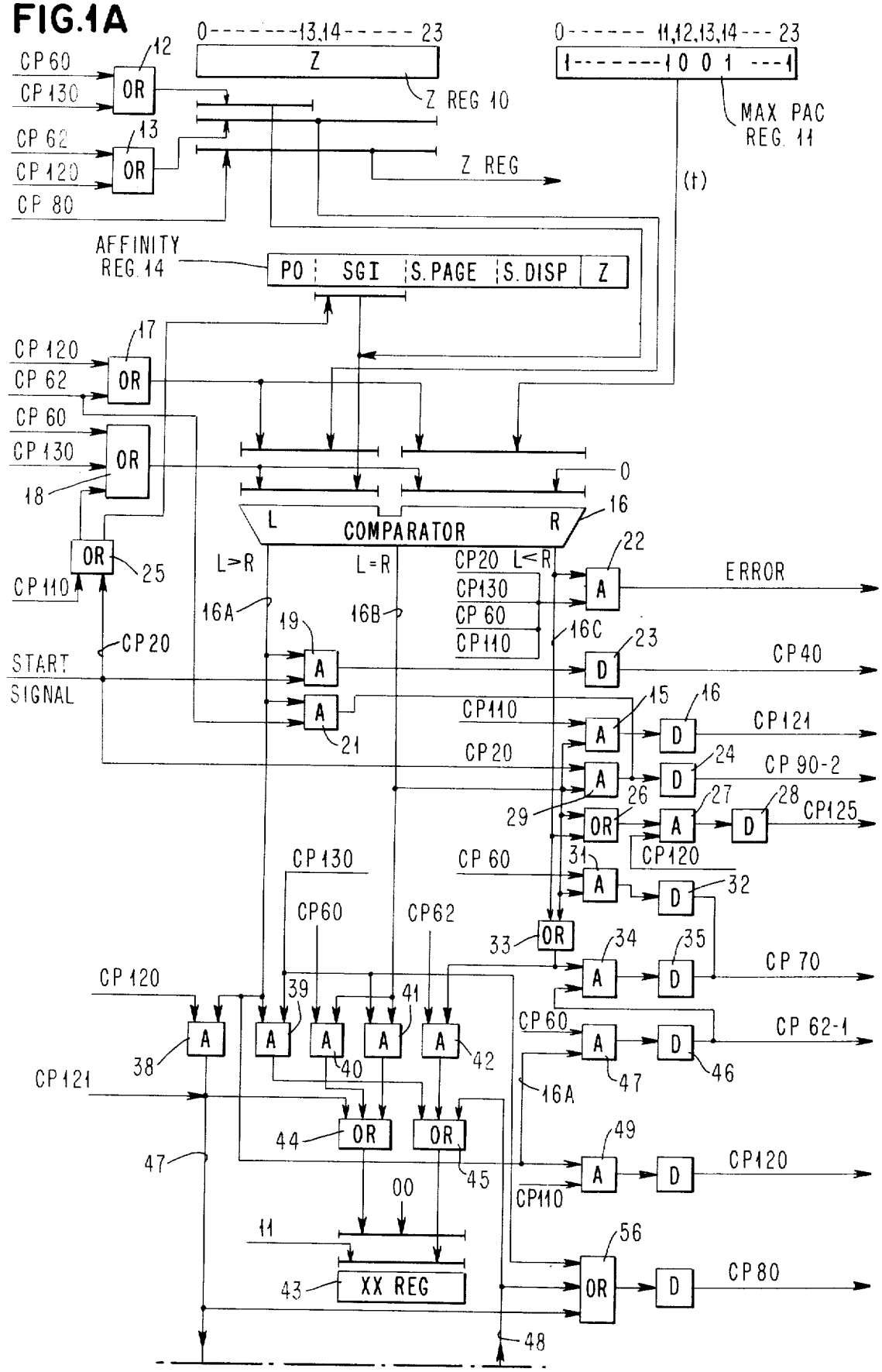
Figure 1B:
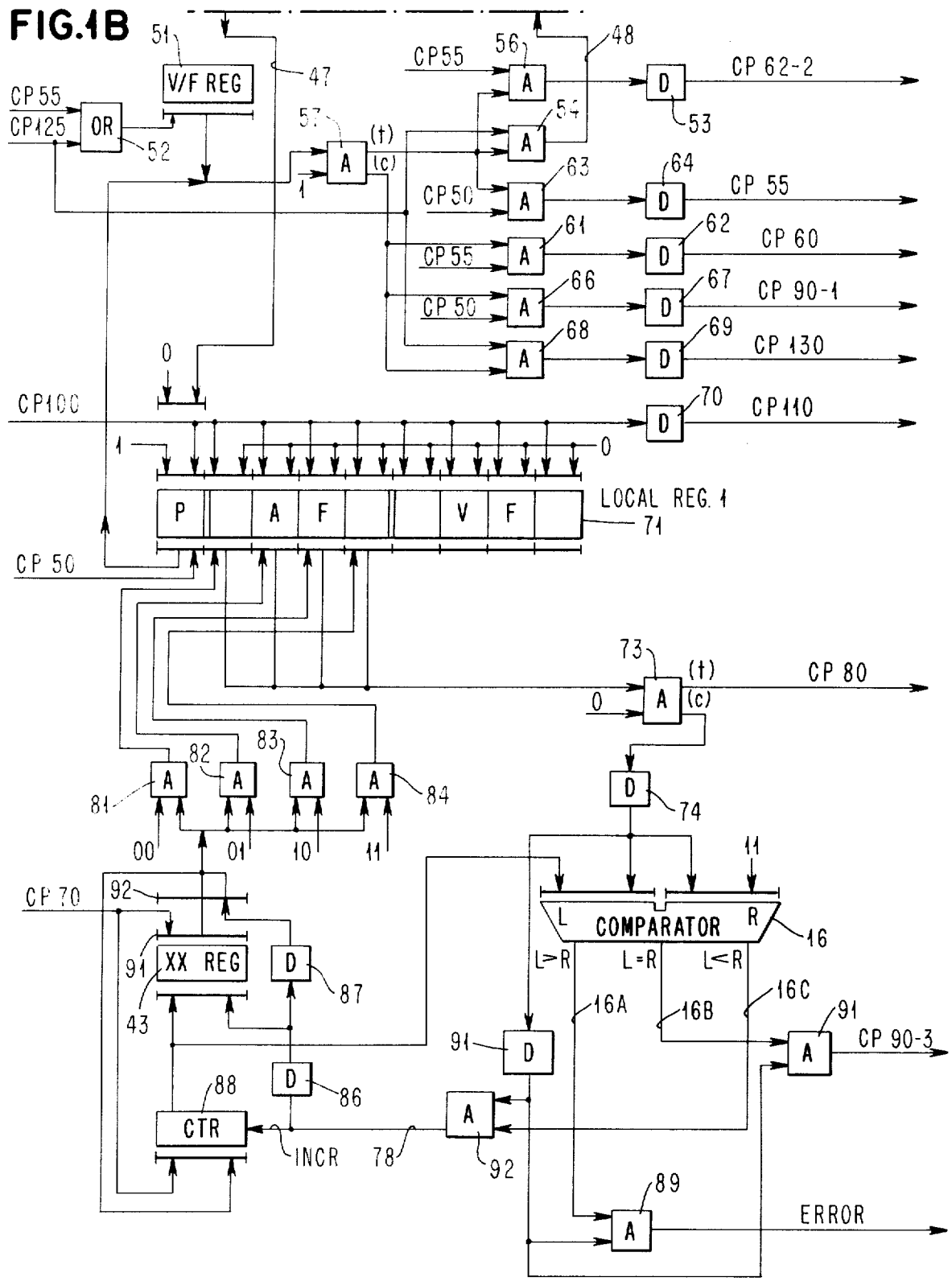
Figure 1C:
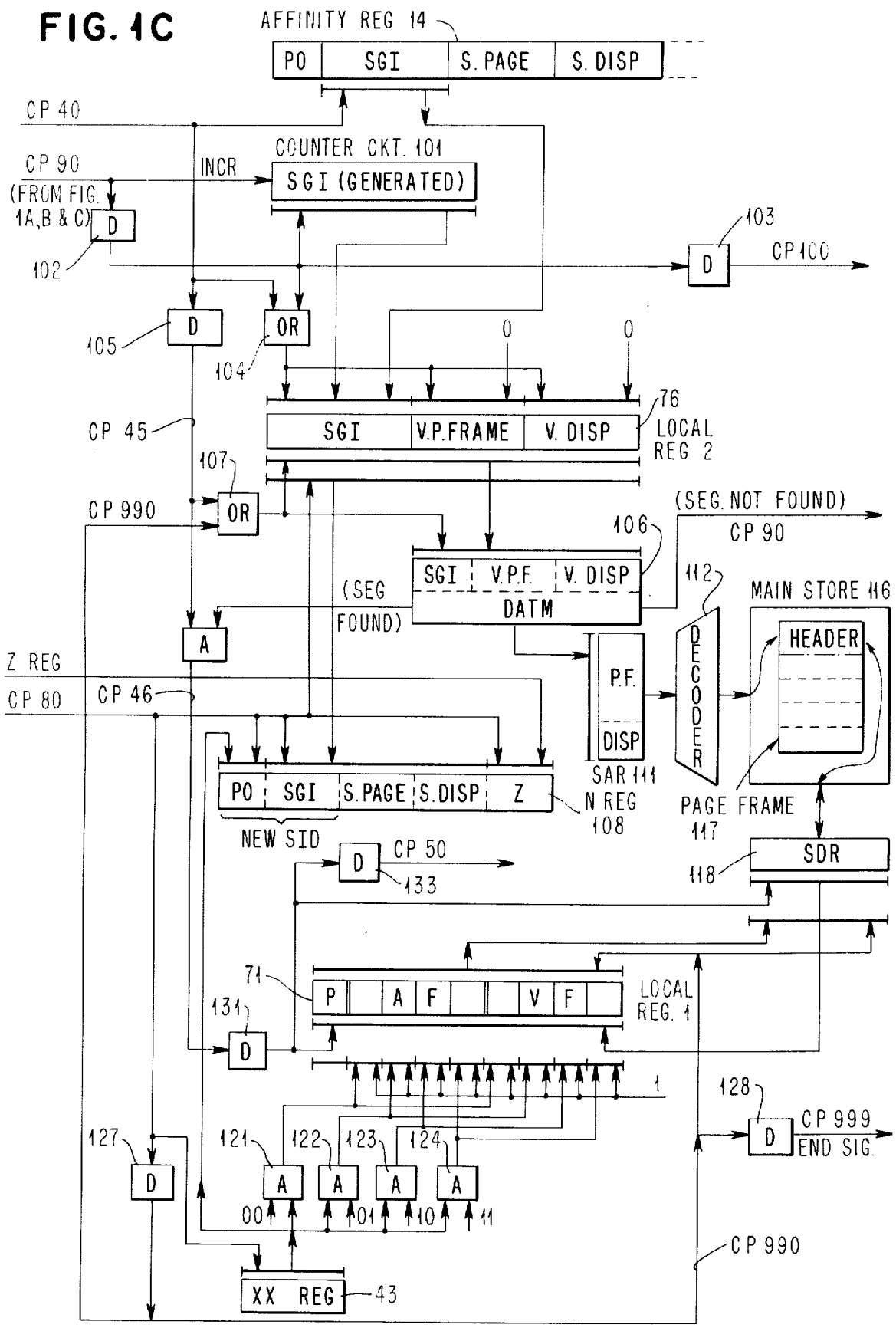

The embodiment shown in FIGS. 1A, 1B and 1C can pack up to four segments into a page frame, in which the last partition may receive a whole or part of a variable segment or the initial part of a large segment. That is, in this embodiment, a packed large or variable size segment must begin in the last partition of a page frame, regardless of whether there are one, two or three small segments also packed in the other partitions of the page frame. Unpacked segments are begun in the first partition.

A segment is delineated by a pointer which in addition to having an address indicating the beginning of the segment also has a field Z indicating the end of the segment, such as shown in FIGS. 2A, B and C. The segment addresses shown in FIGS. 7A or 7C have the same form as the pointer in FIG. 7B except they do not have the Z field; hence pointer registers can also accommodate segment addresses. The virtual address is translated to a main store address in the conventional manner for accessing any byte of a segment in a page frame. The SID and page fields in a packed segment address relate a segment to a page frame in main store, and all segments packed in the same page frame will have the same SGI field, but they will have different PO fields, such as shown in FIG. 2C. The combination of the PO and SGI fields provide the SID which uniquely identifies each of the segments packed together in the same page frame.

The operation of FIGS. 1A – 1C begins when a create segment instruction of the type shown in FIG. 1D is decoded during the execution of a program. Registers N, Z and A were previously loaded by conventional loading instructions. When the create segment instruction begins execution, a start signal is generated by the CPU in the conventional manner and is provided on the start signal lines which provide clock pulse CP 20 in FIG. 1A.

Figure 3:
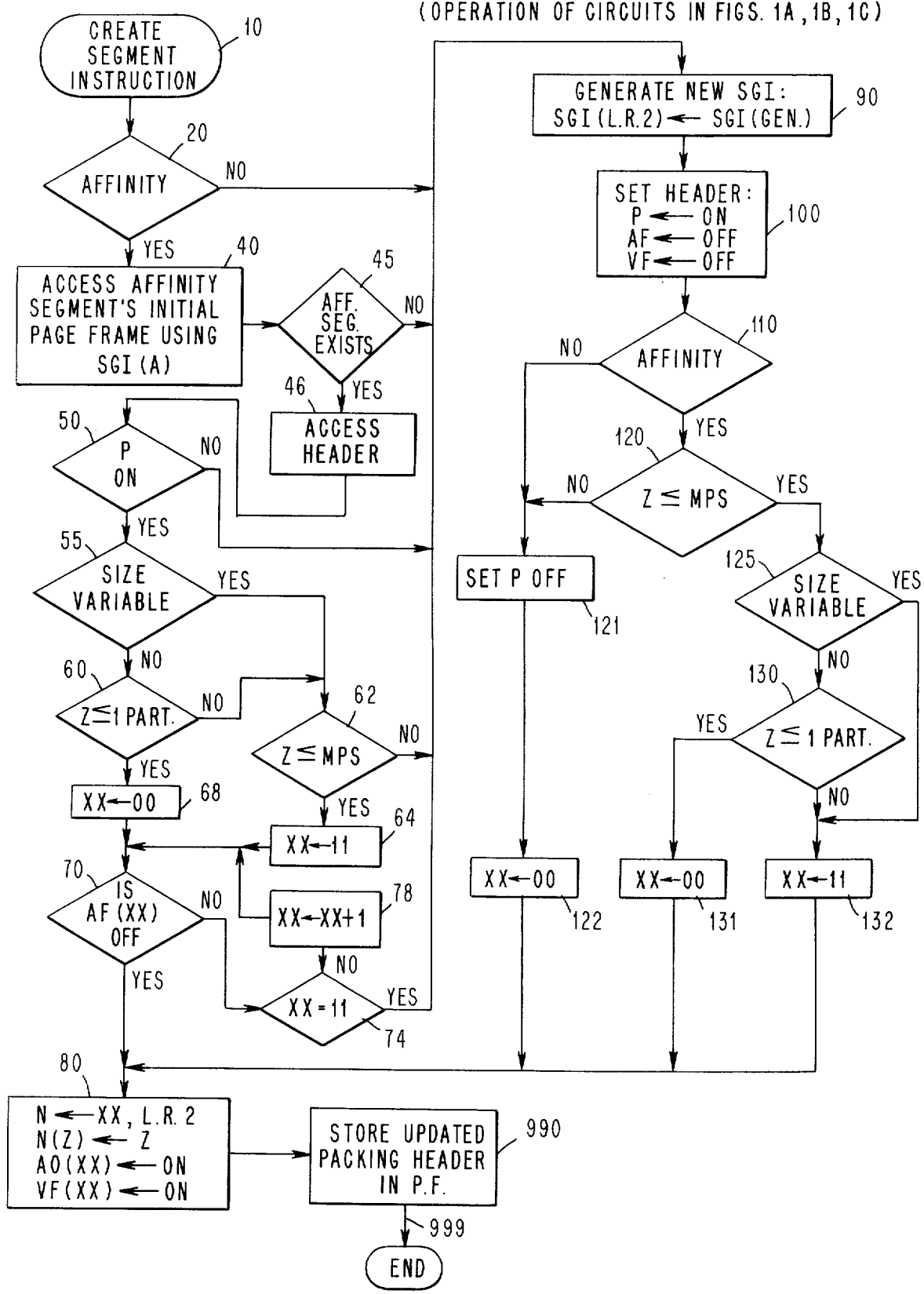
FIG. 3 shows the operations of FIGS. 1A through 1C.

The operation of the hardware in FIGS. 1A – 1C can be more easily followed by using the operation diagram in FIG. 3 which begins at step 10 which is the decoding of a create segment instruction by the CPU.

Step 20 in FIG. 3 is performed by the hardware in FIG. 1A in response to its receiving a start signal providing a clock pulse CP 20. CP 20 gates out the SGI field in affinity register 14 to the L input of a comparator 16 and gates in a zero signal into the R input of comparator 16. Register 14 is a pointer register which contains the pointer for an affinity segment, if one is specified. If no affinity is specified, it contains a zero setting.

The terminology 0 and 1 are used herein to represent two different voltage/current levels. Where a 0 or 1 input is shown as the input to a line, it represents a voltage/current source which provides the respective voltage/current source needed by that line. Likewise a 0 or 1 output on a line means that the respective voltage/current level is provided.

In response to CP 20 in FIG. 1A, comparator 16 provides an output pulse on either its output line 16A or 16B according to whether the SGI field is zero or not, respectively. If zero, no affinity segment is specified, which is signalled by a clock pulse 90 provided through an AND circuit 29 and a delay circuit 24. However if an affinity segment is specified in register 14, an alternative clock pulse CP 40 is provided by activation of AND circuit 19 and delay circuit 23. The operation of the circuitry will proceed according to whether CP 40 or CP 90 is provided.

Since the SGI field is designed to be only zero or positive, there can be no output from comparator line 16C, and it will generate an error output through AND gate 22 if it should be activated during CP 20.

CP 40 will activate the circuitry which accesses the page frame header field of the page frame containing the affinity segment; while clock pulse 90 will cause the new segment to be the first (and perhaps the only) segment in a page frame.

Figure 8:
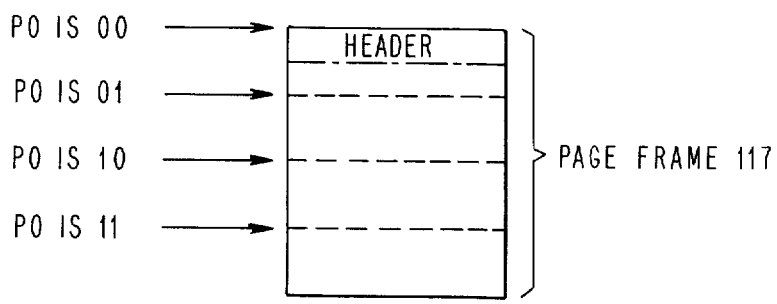
FIG. 8 shows page frame partitions used in the embodiments of the invention.

Thus in FIG. 1C, clock pulse CP 40 outgates the SGI field from affinity register 14 to a local register 76 when CP 40 passes through OR circuit 104. The other fields in register 76 are set to 0 by CP 40. After CP 40 is delayed in circuit 105 to permit ingating into register 76, its content is outgated by CP 45 to a dynamic address translation mechanism DATM 106 which provides a segment found signal CP 46, when it provides a page frame corresponding to the SGI and zero page fields. DATM outputs the page frame address with a zero page frame displacement to a storage address register (SAR) 111. This address accesses the header field of page frame 117 which contains the first virtual page of the affinity segment. The affinity segment can be a small segment occupying any partition in page frame 117 (see FIG. 8), or it may be a varying or large segment which has its initial portion occupying the last partition of page frame 117.

If DATM does not find the segment, which was specified by the affinity register 14, it provides a segment not found signal, which is a CP 90 signal that generates a new SGI for the segment being created. This new segment will be the first segment to be packed in its page frame.

The header field is used by the circuits in FIGS. 1A – 1C. In this embodiment the header is only put at the beginning of the first partition of a page frame which will contain the first virtual page of a segment. The partitions of a packed page frame can only contain the first virtual pages of their respective segments. Other information may appear as a header in addition to the initial header bits which this embodiment transfers to local register 71. Additional header information is not pertinent to the subject invention, except in so far as it may affect the size of the segment being created.

The header word is transferred to SDR (store data register) 118 and then is ingated into local register 71 in FIG. 1C by CP 46 after it has been delayed by circuit 131 to provide time for store 116 and SDR to handle the header field.

In FIG. 1C, clock pulse CP 50 is provided from delay circuits 131 and 133 after they review clock pulse CP 46. In FIG. 1B, CP 50 tests the state of the P bit from the header word in local register 71. CP 50 outgates the P bit to an input of AND circuit 57 which actuates its output (t) if the P bit is set to one to indicate that packing is permitted. But the complementary output (c) is instead activated if no packing is indicated by bit P, and CP 90 is provided from AND 66 and delay 67. If no packing is indicated, then the segment to be created cannot be packed with the affinity segment, and the new segment will be put into another page frame which results from the CP 90.

If the P bit is set to one to indicate that packing is permitted then the (t) output of AND circuit 57 provides clock pulse CP 55 as a result of CP 50 actuating AND circuit 63 and delay 64.

If CP 55 is provided indicating that packing is requested, the V/F register 51 in FIG. 1B is tested to determine if the new segment is to be variable or fixed in size. This is initiated when CP 55 passes through OR circuit 52 and gates out the content of register 51 to AND circuit 57, which has its other input receiving a 1 current level. If register 51 contains a 1 setting, indicating a variable size, then the true (t) output of AND 57 is activated which generates a clock pulse CP 62 from AND circuit 56 and delay circuit 53. But if a fixed size segment is specified by a zero content in register 51, the complementary output is provided from AND circuit 57 which causes AND 61 and delay circuit 62 to provide a clock pulse CP 60.

CP 62 will activate circuitry to determine if the variable size segment is packable; while CP 60 will determine if the fixed size segment will fit into one partition.

In FIG. 1A, CP 60 activates circuitry which determines if the new segment can fit into a single partition of a page frame. This is done by testing for all zeros the high order bits in the size register Z in FIG. 1A; these high order bits will not be set by a segment size less than or equal to a single partition. Thus clock pulse 60 outgates bit positions 0 through 14 in the Z register to the L input of comparator 16 while its R input receives all zeros in the corresponding positions. If these high order bits are all zero, a pulse is provided on line 16B which passes through AND 40 and OR 44 to cause the ingating of 00 into $xx$ registr 43, which is used in generating the PO bits for the new segment's pointer and virtual address.

Also, line 16B passes through AND 31 and delay 32 to provide CP 70. If the high order bits are not all zero, the size specified for the new segment in register Z is greater than one partition, and a signal is provided instead on line 16A to indicate that the new segment size will not fit into a single partition. If this is the case, a pulse CP 62 is generated from line 16A through AND 47 and delay circuit 46.

If CP 62 is provided indicating that the new segment will not occupy one partition, it actuates circuitry to determine if the new segment can be packed beginning in the last partition of the page frame. A large or varying size segment is packable only if its requested size is not greater than three-fourths of a page frame less than the maximum size for any segment. For example if the maximum size segment is $2^{24}$ bytes, the maximum packable segment will be three-fourths of a page frame less than $2^{24}$ bytes. The reason for this three-fourths restriction is to prevent overflow at the end of a packed maximum size segment into a non-addressable page, which could occur if a packed page frame were to extend beyond this maximum packable size (MPS). This maximum packable size is contained in maxpac register 11 in FIG. 1A. Thus CP 62 outgates the new segment size in Z register 10 into the L input of comparator 16 and outgates the content of maxpac register 11 into the R input of comparator 16 (permissible segment equals $2^{24}$ less 3,072 bytes, where three-fourths of a 4,096 byte page frame size is 3,072).

If the segment size is larger than the maximum packable amount, it can not be packed, and line 16A passing through AND 21 and delay 24 provides CP 90 which initiates a sequence of acts which will cause this segment to be started in another page frame.

If comparator 16 provides an equal or less than output on lines 16B and 16C, the large segment is packable. These signals are provided through OR circuit 33 AND gate 42, and OR circuit 45 to ingate a 11 into the $xx$ register 43. Thus the last partition in affinity page frame 117 will be assigned to a large packable segment if the last partition is available, i.e. not already allocated to some other segment. The output of OR circuit 33 activates AND gate 34 and delay circuit 35 to provide a clock pulse CP 70 which actuates circuitry that determines if the partition specified by the current $xx$ register content can be assigned to the segment. CP 70 is provided to FIG. 1B.

CP 70 outgates the content of the $xx$ register 43 through gate 91 to counter 88, and to AND gates 81 – 84 activating that gate which receives its other input equal to the content of the $xx$ register. The selected one of AND gates 81 – 84 outgates an availability flag (AF) bit in the header field found in local register 71 for the partition represented by the PO bits in the $xx$ register 43. It will be recalled that $xx$ register was set to 00 by CP 60 to represent the first partition if the new segment was found to fit in a single partition; but if the new segment was greater than one partition in size, the $xx$ register was set by CP 62 to 11 to represent the last partition. Thus gated AF bit is tested to determine if the partition represented in the $xx$ register is available in the page frame 117 for receiving the new segment. If the AF bit is 0, the partition is available; and if 1, the partition is not available. The status of this AF bit is tested by being provided to AND gate 73 which activates its ($t$) output if the respective partition is available, i.e. the AF bit is zero. Then the ($t$) output provides CP 80 to FIG. 1C to signal that the new segment can be packed in the partition indicated by the $xx$ register of the same page frame as the affinity segment.

On the other hand, if the ($c$) output is actuated by AND 73, the partition is not available, and the $xx$ register content is tested to see if it represents the last partition, i.e. $xx$ is 11. This is done by gating the content of counter 88 (which was ingated with the content of the $xx$ register by CP 70) into the L input and a 11 signal into the R input of comparator 16. This performs operation 74 in FIG. 3.

If $xx$ is 11, then CP 90 is generated when line 16B activates the output of AND gate 91.

However, if $xx$ is not 11 then the content of counter 88 is incremented through AND gate 92, and after delay 86 the counter content is gated into the $xx$ register. After the gating signal is delayed through delay 87 the cycle is complete and the circuit is ready to check the next AF bit The availability of each succeeding partition is tested until one is found to be available, or all are found unavailable.

If the next partition is not available, the counter incrementing and setting of the $xx$ register 43 is repeated until a following partition is found available, or until the counter and $xx$ register are set to 11 which is signalled when CP 90 is generated from line 16B. CP 90 activates the circuitry for locating the new segment in a different page frame from the affinity segment.

If an AF bit was found to be off, that partition will be provided for the new segment. This is done in FIG. 1C by the circuitry initiated by CP 80 which generates the pointer for new segment, and sets the header's validity bit and availability bit for the $xx$ partition to valid and unavailable. (Previously CP 40 has transferred the affinity segment SGI into local register 76 from the affinity register 72, and CP 40 also caused zero settings in the virtual page and virtual displacement fields in register 76.)

To generate the pointer in register 108, CP 80 gates into the N register 108 the PO field in $xx$ register 43, the SGI and page and displacement fields in register 76, and the content of the Z register. Register 108 is the N register designated by the create segment instruction shown in FIG. 1D which provides the user with the identifier and the range of addressability for the new segment.

CP 80 also outgated content of the $xx$ register to actuate one of AND gates 121 – 124 which has its other input corresponding to that PO valve and thereby selects the appropriate AF and VF bit positions in register 71, wherein those bits are set to 1 to indicate that the respective partition is valid and no longer available. CP 990 is provided from delay circuit 127 after it receives CP 80. CP 990 outgates register 76 to DATM to address the header in main memory and outgates the updated header word content in local register 71 into the SDR which then inserts the updated header into the initial location in a page frame 117 which is provided by DATM in main store 116 while DATM is being gated the virtual address in register 76. The operation is ended when CP 999 is provided from delay circuit 128 in response to a pulse from CP 990.

The assigned partition is available to receive any data object not over one partition in size which is provided for this segment; and that data object can thereafter be referenced by using the pointer generated in N register by referencing page 0 of the segment identified by that pointer. If it is a large segment, any data within it can be referenced by specifing the segment's page containing the required data.

CP 90 is generated whenever the new segment is to be put into a page frame which is different from the specified affinity segment or where no affinity segment is specified. Thus CP 90 causes a new SGI to be generated for the new segment. CP 90 is generated under four circumstances: (1) if during CP 20 the affinity register contains a zero content indicating that no affinity exists, (2) if during CP 50 the P bit is found to be set to an unpacked state, (3) if during CP 62, the segment size in register Z is greater than the maximum packable segment size, (4) if during CP 70 no partition in the affinity page frame is available for the new segment.

Hence in FIG. 1C, CP 90 increments the SGI counter circuit to generate a new SGI, which represents a new virtual page frame in which to put the segment being created. CP 90 increments a counter circuit 101 which generates all SGI's in the system. Counter circuit 101 may be a conventional binary counter circuit. There is no other source of SGI's in the same data processing system, except possibly for other similar counters precisely synchronized with counter 101.

When the data processing system is installed, the SGI counter is set to its initial value, e.g. zero. The SGI counter generates a unique SGI content each time it is incremented.

After CP 90 is delayed slightly in delay circuit 102, it outgates the new SGI from counter 101 into local register 76 while ingating zeros into the virtual page field and virtual displacement field within local register 76. The content of local register 76 thus contains the initial stages in the generation of a new pointer for the new segment being created.

A clock pulse CP 100 is formed from CP 90 being delayed through circuits 102 and 103. In FIG. 1B, CP 100 initializes a header word in local register 71 for the new virtual page frame by setting to 1 the packing bit P, and setting to 0 all of the AF bits and VF bits. As a result of CP 100, the new header word is initialized to indicate that the new page frame is packable, and that all of its partitions are available and invalid. CP 110 is generated after CP 100 is delayed in a delay circuit.

It may be desired to make a new segment packable when it is the first segment to be put into a page frame. This may occur explicitly if it is known that the page frame contains no other segment, or implicitly if there was no available partition in the page frame with a specified affinity segment. Explicit first segment packing can be done by initially loading the affinity register 14 with a pointer to a non-existent segment, or to a segment known to be unpackable, or to a segment known to be packed in a filled page frame; a dummy segment pointer may be made available for this purpose. Implicit first segment packing is done when the affinity segment's page frame has no partition available to receive the segment, i.e. any available partition for receiving a fixed small segment, or the last partition available for receiving a variable segment or a long segment. In all of these cases the P bit setting indicated packability done by CP 100 is not changed.

Thus packing is specified by any non-zero setting of register 14, and output line 16A is energized, which generates CP 120 through AND circuit 49 and a delay circuit to signal that the new page frame should be packable.

If no affinity has been specified by having a zero content in the affinity register 14, the P bit is set to 0 to indicate the new page frame is not packable. This is done in FIG. 1A, when CP 110 tests for an affinity request in the same way and with the same circuits that CP 20 was previously explained to use to test for an affinity request, i.e. by testing the zero state of the SGI field in affinity register 14. If affinity was not specified, CP 121 is generated from AND circuit 15 and delay circuit 16 when comparator 16 provides a signal on its output line 16B.

CP 121 then energizes output line 47 in FIG. 1A, which in FIG. 1B ingates a 0 into the P bit position of register 71 so that a non-packable condition is thereafter indicated for the new page frame. Furthermore, line 47 in FIG. 1A passes through OR circuit 44 and ingates 00 into xx register 43 so that it indicates that the new segment is to be put in the first partition of the new page frame.

In FIG. 1A if affinity was specified, clock pulse CP 120 initiates circuitry which determines if the new segment is too large to be packed, in which case the new page frame is made unpackable even if affinity was specified. This is done by CP 120 gating the specified size of the new segment in register Z to the L input of comparator 16 and gating the maximum packing size in maxpac register 11 into the R input of comparator 16. If the segment size is greater than the maximum packing size, line 16A energized AND gate 38 and line 47 to set to 0 level the P bit in the header field being formed in local register 71 in FIG. 1B, and in FIG. 1A ingating 00 into the xx register, in the same manner as was previously explained for CP 121. It is noted in FIG. 3 that this performs the sequence of operations seen as the yes exit from step 110, the step 120 no exit, step 121 and step 122. Also in FIG. 1A, the electrical signal on line 47 passes through OR circuit 56 and delay circuit to generate CP 80, which actuates the circuitry in FIG. 1C which operates a previously explained for CP 80 to cause the formation of the new segment pointer in N register 108 and the resulting storing in page frame 117 of the header in register 71, so that the data in the new segment can be stored in the assigned partition under the control of the new pointer by means outside the scope of this invention.

However if the new segment size is less than the maximum packable size, the segment may be packed in the new page frame. But other conditions still have to be considered to determine how the new segment will be packed, i.e. in first partition 00 or in the last partition 11. This depends on whether the new segment is a small fixed size segment which will be packed in the initial partition of the page frame, or whether it is a large segment or a variable length segment which will only be packed in the last partition of the page frame. This sequence of operations is shown in FIG. 3 from the yes exit of step 120. These operations are actuated by the generation of clock pulse CP 125 in FIG. 1A when OR circuit 26 is energized by either line 16B or 16C while AND gate 27 is enabled by CP 120 to provide CP 125 from the output of delay circuit 28.

CP 125 actuates circuitry in FIG. 1B which determines whether the new segment size is specified as variable or fixed. This is done when CP 125 passes through OR circuit 52 to outgate content of V/F register 51 to AND gate 57. The ($t$) output of AND circuit 57 is activated if register 51 contains a 1 bit setting indicating that the segment is variable in size. Then AND gate 54 signals its output line 48. In FIG. 1A, line 48 provides the signal through OR circuit 45 to ingate a 11 signal into xx register 43, which is the PO for the last partition. Furthermore line 48 causes a signal to pass through OR circuit 56 and a delay circuit to generate CP 80 which causes the operations previously described in FIG. 1C to cause the new segment to be put into the last partition (PO of 11) in the new segment.

On the other hand in FIG. 1B, if the V/F register specifies a fixed segment, its zero setting causes AND circuit 57 to energize its (c) output which generates CP 130 through AND circuit 68 and delay circuit 69. CP 130 signals that the segment should be put in the initial partition of the new page frame if it is a small segment.

The circuitry to do this is actuated by CP 130 in FIG. 1A. CP 130 passes through OR circuit 12 and outgates the high order bits of size register Z to determine if they are all zeros in the same manner as was previously explained for CP 60. This involves comparator 16 comparing these bits against a zero field provided to its R input. If the comparator finds that the high order Z bits are all zero, it actuates its line 16B, and if they are not all zero it actuates its line 16A.

When line 16A is actuated, the new segment is not a small segment, and it is packed in the last partition. This is done when AND gate 39 is activated by line 16A and CP 130 to generate a signal that passes through OR circuit 45 which ingates 11 into xx register 43. Line 16A also activates OR circuit 56 to generate a clock pulse CP 80 which then operates in the manner previously explained to cause the completion of operations.

However if the fixed segment is found to be a small segment, it is put into the first partition in the new page frame, having a PO of 00. This is done when AND circuit 41 is energized by line 16B and CP 130 to provide a signal through OR circuit 44 which causes 00 to be ingated to register 43, and also generates CP 80 through OR circuit 56, as previously explained, in order to start the compeletion of operations resulting in the packing of the new segment in the initial partition of the page frame.

FIGS. 2A, 2B and 2C show examples of page frame packing of the type which may be obtained by operation of the circuitry in FIGS. 1A, 1B and 1C. In FIG. 2A, a single segment S1 is shown to occupy the first partition having a PO of 00 and containing the header field of all segments packed in this page frame 117 (which also share the same SGI field). The header field now contains the current header which indicates that the first partition is not available and is valid. The segment S1 is identified by the S1 pointer containing a segment identifier (SID) which comprises the PO field of 00 and SGI field. The displacement and Z fields indicate the beginning and end of the segment. It will be noted that the beginning and end of the segment indicated by the DISP and Z fields in the pointer are not necessarily the beginning and end of a page frame partition. It will be noted that the initially specified segment size in register Z also specifies the last address of the segment in FIG. 2B, a second small fixed size segment is inserted into the second partition of the same page frame shown in FIG. 2A. The unique SID in the pointer for segment S2 has a PO of 01 and the same SGI field as was used in the S1 pointer.

FIG. 2C further illustrates the insertion of a long segment which is greater in size than a single partition. The beginning part of S4 is assigned to the last partition in the page frame, having a PO of 11. The S4 pointer contains this PO and also contains the same SGI field as found in the S1 and S2 pointers. The S4 segment is a long segment, and hence it only partly fits into the last partition which includes its beginning identified by the DISP field in its pointer. It must overflow into one or more other page frames, and the end of the segment is indicated by the Z field which indicates the last page and the displacement of the segment.

Note that segment pages do not align with main storage page frames.

It is noted that the P, AF and VF fields in the header in FIGS. 2A, 2B and 2C are updated in each case to reflect the state of the partitions.

It is also noted that if the S4 segment had been specified to be variable, whether it is a small or large segment, it would only be packed into the last partition. Segment variability in accommodated by varying the last address Z in the pointer after it is created, which does not interfere with packing because all variable segments are in the last partition of a packed page frame and can only overflow into another page frame.

The validity bits may be used at some future time in removing a packed segment from the page frame. In such case its validity bit is reset to an invalid state. This manipulation of the VF bits is not part of the subject invention, except in so far as the subject invention provides these bits for use in managing the segment.

After the segments are generated and put into page frames, whether packed or unpacked, the information in any segment is addressable by any program provided with a pointer to that segment. Note that addressability to only part of a segment is possible by setting the page, displacement and Z fields to delineate a range which is less than the full segment size. This however is outside the scope and concern of this invention.

Figure 4B:
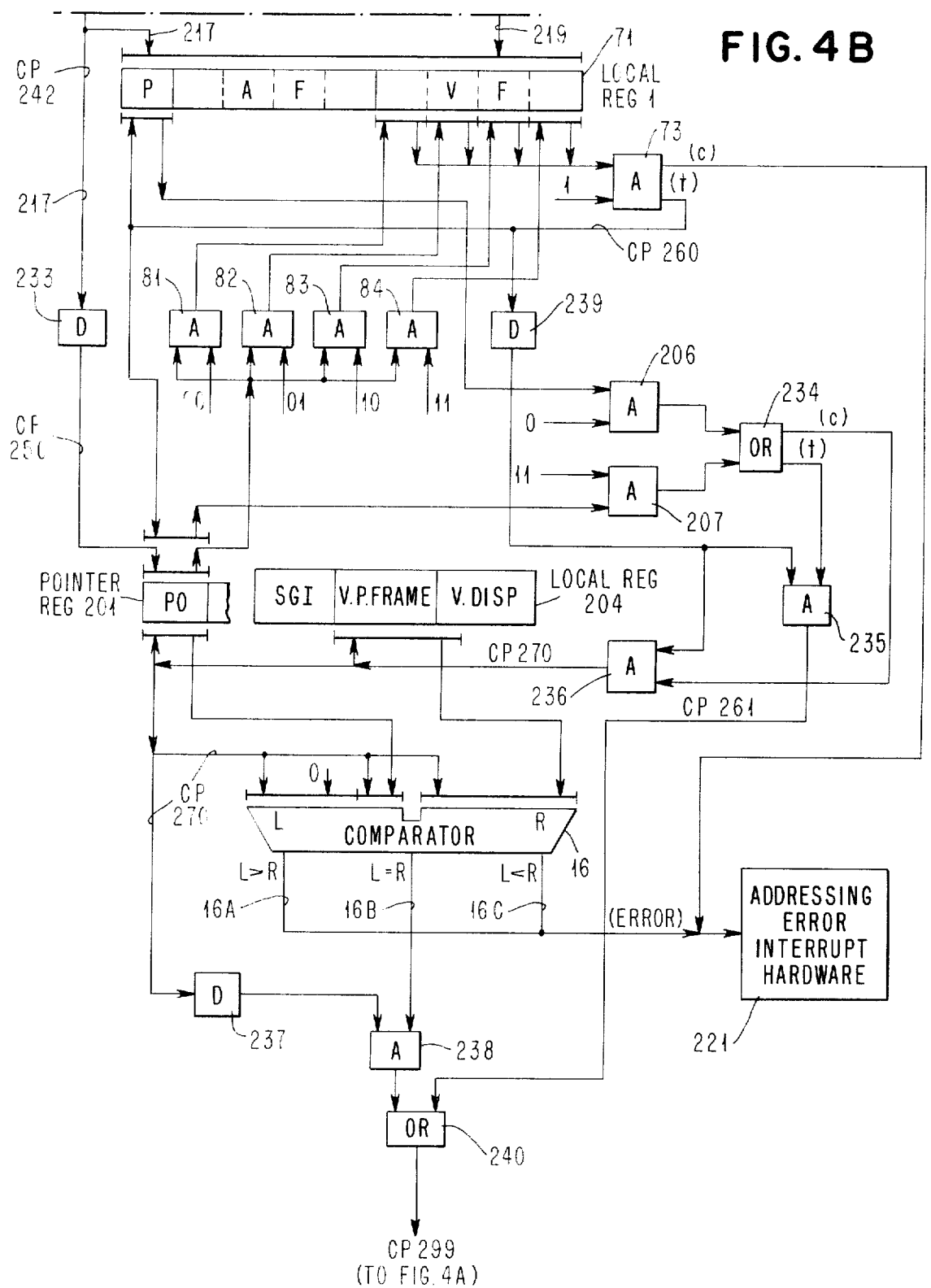

FIG. 4A illustrates circuitry for generating the addresses to information in any segment, and checking the addresses to assure that no address accidentally strays beyond a partition boundary into a next following partition having a different segment in the same page frame. This circuitry will generate an addressing error interrupt signal if an address provided by an instruction should attempt to address into a next segment in the same page frame. The addressing error interrupt hardware 221 is shown in FIG. 4B.

The operations by the circuitry in FIGS. 4A and 4B can be followed using the operation diagram shown in FIG. 9.

Figure 7E:
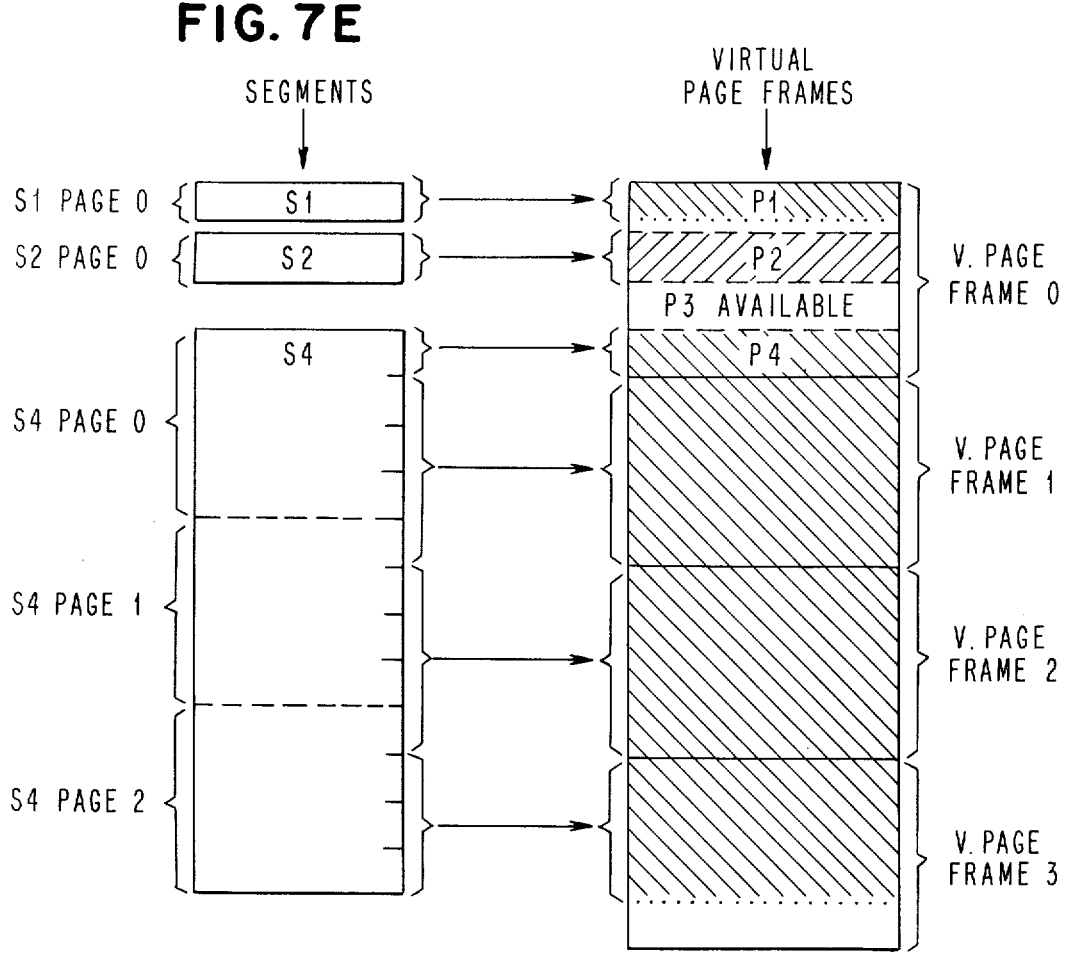
FIG. 7E shows the packing and alignment relationships between segment pages and virtual page frames.

A pointer (which contains the packed segment address) such as shown in FIG. 7B, is initially specified by an operand in a machine instruction. The pointer is placed in a register 201 in FIG. 4A. The pointer may be modified by the content of an index register 202 in order to more conveniently locate data in a segment. Adder 203 ingates outputs from pointer register 201 and index register 202 in response to a memory access start signal to generate a virtual address (VA) of the type illustrated in FIG. 7C. Adder 203 does this by ingating the PO bits to bit positions corresponding to the highest order bit positions in the segment displacement field as illustrated in FIG. 7C. It also ingates the content of index register 202 to bit positions corresponding to the segment page and segment displacement fields as also shown in FIG. 7A. The adder output is a virtual address placed in a local register 204 which may be the same register as register 76 in FIG. 1C.

Register 204 receives the same SGI field found in register 201, but the page and displacement fields are modified by the PO bits and index bits, if any. If no index register is specified by a current instruction, zeros are ingated to the index input of the adder 203.

The virtual address in register 204 is gated into a dynamic address translation mechanism (DATM) 106 shown in FIG. 4A in response to CP 240 occurring after the start signal is applied to delay circuit 211. DATM operations are well known in the art and are only indirectly related to this invention, and hence are explained only in a summary fashion herein. For example, the commercial IBM S/370 M168 has dynamic address translation. The assigned page frame and the displacement provide a main store address having the form shown in FIG. 6B, which is a conventional form of address found in commercial virtual addressing systems.

In FIG. 4A DATM assigns a hardware page frame in main store 116 to the SGI and virtual page fields in the virtual address in register 204. DATM outputs the main store adress to SAR 111. The main store address comprises the assigned page frame and a displacement which is the same as the virtual displacement field in register 204. The assignment of a page frame is done by DATM selecting a register in the group of registers 300 shown in FIG. 4 which has the same SGI and virtual page fields found in register 204. The index of that register in the group determines the assigned page frame in main store 116. If no register is found to contain the SGI and virtual page fields, then any unassigned register is picked by assigning any register having its availability bit (AB) set to zero indicating that it is available, and transferring into it the SGI and virtual page fields from the register 204 and setting its AB bit to 1.

The main store address is provided to the storage address register (SAR) 111 and decoder 112 to access the page frame 117 in the conventional manner. Operation 204 in FIG. 9 is thereby performed.

The invention provides a partition boundary checking operation as a preliminary part of each operand access in main store 116. An initial check signal causes a zero displacement to be momentarily provided through the decoder 112 so that the header field in the page frame 117 is accessed, so that its packing bit and validity flag bits can be checked prior to granting the access to the address in SAR 111.

A delay circuit 212 is actuated by CP 240 and provides CP 241 as an initial check signal which sets a check control latch 215. When set, latch 215 provides an output signal that ingates a zero displacement signal into decoder 112 whcih overrides the displacement address concurrently received in SAR 11 from DATM, but the page frame address in SAR 11 is passed through decoder 112 so that the header field at the beginning of page frame 117 is addressed and is accessed and put into SDR 118. The initial check signal also provides an input to a delay circuit 231 which outputs CP 242 which in FIG. 4B outgates the heater from SDR 118 into local register 71. Operation 245 in FIG. 9 is thereby performed.

In FIG. 4A, CP 242 also resets latch 215 so that the requested access can be started and will overlap the checking operating performed by the circuits in FIG. 4B. The accessed information is not available until checking is completed, which however may be completed before the information access into SDR 118 is completed.

In order to perform operation 260 in FIG. 9, CP 242 is also applied to line 217 to delay circuit 233 in FIG. 4B which provides CP 250 that actuates the circuitry which tests the state of the P bit and validity bit field in the header in register 71. CP 250 outgates the PO field in pointer register 201; its PO part shown in FIG. 4B is the same PO part of pointer register 201 shown in FIG. 4A. The outgated PO field enables one of the AND gates 81 to 84 which has its other input equal to the PO field, so that the VF bit position in register 71 for the partition represented by the PO field is outgated and tested by AND circuit 73. If this validity flag bit is set to 1, it indicates that the segment in that partition is valid. If it is set to 0, the access is suppressed and an error condition is generated by a signal on the (c) output line provided from AND 73 to the interrupt hardware 221.

Thus, if the partition is valid, the (t) output of AND circuit 73 provides CP 260 which outgates the header P bit in register 71 for testing by an AND circuit 206, and CP 260 also outgates the PO field in register 201 for testing by an another AND gate 207. AND 206 provides an output if the header P bit is set to 0 which indicates no packing. AND 207 provides an output if the PO field indicates that the required segment is in the last partition of the page frame. The outputs of AND gates 206 and 207 are both provided to an OR circuit 234 which has a true (t) output and a (c) complementary output.

The partition boundary checking operation is bypassed if either no packing or the last partition is indicated by either output of gates 206 or 207. No checking is done for the last partition because addressing beyond it does not index into another partition but simply goes outside of the page frame and causes a page fault, which is checked by other means found in conventional systems. Activation of either of these conditions energizes the (t) output from OR circuit 234. The (t) output passes through AND 235 after it is gated by a delayed CP 260 pulse to provide CP 261. CP 261 activates OR circuit 240 to provide CP 299 which in FIG. 4A permits the outgating of the data from SAR 111, after it is accessed from the displacement address in the page frame 117.

However, if packing is indicated by the P bit and PO identifies one of the first three partitions, which has a valid segment, the address checking circuit performs operation 270 in FIG. 9. Then in FIG. 4B, the (c) output is provided from OR circuit 234. The (c) line connects to an AND circuit 236 that receives the delayed CP 260 pulse to provide an energized output CP 270 which causes the address to be partition checked to determine if it exceeds the end of the partition identified by the PO field in the segment address. (It is assumed the system does not provide negative indexing, so that the user is unable to address into a prior partition above the beginning of the respective segment.)

Only a part of a virtual address in register 204 needs to be used in checking whether the access has exceeded the end boundary of the pertinent partition. The circuit in FIG. 4B checks the partition defined by the PO field in the pointer register 201 against the field in local register 204 comprising its virtual page field and the two highest order bits in its virtual displacement field. The virtual page field will be zero for any small packed segment which is to be checked, since a small segment can not exceed one page. The highest order two bits in the virtual displacement field include the PO adjustment to the displacement field in the segment address.

Accordingly in FIG. 4B, CP 270 transfers the virtual page field with the two highest order bits of the displacement field in register 204 into the R input of comparator 16, and CP 270 also ingates into low order bit positions of the L input of the comparator 16 the two PO bits taken from register 201 and in the higher order bit positions of the L input ingates 0 in a number of bits which corresponds to the number of bits in the virtual page field. The L and R ingated fields should be equal if the virtual address in register 201 is within the partition specified by the PO field in register 201.

If the comparator inputs are equal, line 16B is actuated, and when AND circuit 238 receives the delayed pulse CP 270, CP 299 is provided from OR circuit 240. CP 299 is provided to the SDR outgate in FIG. 4A to condition the access of the data from the correct partition.

If the comparator inputs are not equal the addressing is beyond the specified partition and an error condition occurs which actuates addressing error interrupt hardware 221. Also AND gate 238 is not conditioned by line 16B, and therefore no CP 299 signal is provided to condition the access of data from SDR 118; hence the access cannot be made. Other conditions not a part of this invention can also control the outgating of data from the SDR 118.

It will be apparent to those skilled in the art that numerous modifications may be made in this embodiment which are within the spirit and scope of this invention. For example, the initial flag bit tests for packing status of the affinity segment's page frame and the availability of a required partition can be done with flag bits in the assigned register 300 instead of the header field. Furthemore the number of partitions may be a number other than the four partitions shown in FIG. 8 used in this embodiment example provided by the two bit PO field. Thus a one bit PO feld would provide for two partitions, a three bit PO field for 8 partitions, a four bit PO field for 16 partitions, etc., in each page frame.

Furthermore, the embodiment packs small fixed segments into any of the four partitions in a page frame, but it only packs long segments and variable segments starting in the last partition in a page frame. It is apparent that long segments or variable segments could be packed starting in other partitions or a combination of partitions, etc. However, when packing is disabled, the embodiment permits variable or long segments to occupy up to all of a page frame.

Also, it is possible to pack segments which are bigger than one partition but less than the number of partitions in a page frame by using a number of adjacent partitions. For example, a segment greater than one partition but less than or equal to two partitions could be packed using partitions 1 and 2, 2 and 3, or 3 and 4.

Any type of packing, however, which allows segments bigger than one partition to be packed using partitions 1, 2 or 3 complicates the segment packing operations described in FIG. 3, and the extent checking operations described in FIG. 9.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for partitioning page frame hardware components in a main store for packing a plurality of segments in any page frame, comprising
    a first register for receiving and providing an affinity signal locating an existing segment with which a new segment is to be packed in a page frame,
    means for accessing a flag field for an affinity page frame containing a first page of the existing segment located by said first register,
    a second register receiving and providing a size signal for the new segment,
    comparator means connected through gate circuits to said first register and to said second register and to partition size signals to provide a first electrical signal if the new segment size is greater than one partition in a page frame and to provide a second electrical signal if the new segment size is less than a maximum packable segment,
    gating means and an AND circuit for testing a packing bit and an availability flag bit in said flag field for generating electrical signals indicating if the affinity page frame is packable and which partition in the page frame is available,
    an offset register to provide signals for locating partitions of a page frame,
    means for connecting said offset register to an output of said gating means to set the offset register to the location of a partition found available by said gating means, and
    means for generating and storing electrical pointer signals for delineating and locating the new segment by actuating other gating circuits with said first and second electrical signals to transfer output signals from said second register and from said offset register to a pointer register,
    whereby said pointer register contains signals for locating the new segment in the available partition in the page frame of the existing segment.

2. Apparatus for partitioning page frame hardware components in a main store for packing a plurality of segments in any page frame, comprising
    a first register for locating an affinity page frame which is an existing page frame having a partition containing the first page frame of an existing segment,
    means for accessing a flag field for said page frame located by said first register and transferring it into a local register,
    gating means and AND circuits for checking a packing bit and availability flag bits in said flag field in a local register and generating electrical signals indicating that said page frame is packable,
    a second register for providing a new-segment-size signal,
    a comparator having gating means connected between inputs of the comparator and the first register and the second register to provide a first output signal to indicate if packing is to be provided for the new segment in the existing page frame,
    predetermined signals also being gate connected to said comparator for actuating said comparator to provide a fourth output signal for indicating if the new segment will fit into one partition, and a fifth output signal for indicating if the new segment is a packable large segment,
    a third register for receiving and providing a variable/fixed signal for indicating whether the new segment is to be variable or fixed in size, an offset register having gated connections with said comparator and with said third register and being set to indicate any available partition in said existing page frame when receiving the fourth output signal from said comparator and a fixed signal from the third register indicating a fixed size segment; but said offset register being set to indicate a last partition in said page frame when receiving the fifth output signal, counter means for being incremented by said comparator receiving the fourth output signal and the fixed signal for testing the setting of each sequential availability flag bit until said counter means is stopped when it increments to a flag bit set to an available partition, a gating circuit connecting said offset register with the output of said counter to receive its setting upon each incrementing, means for forming and storing an electrical pointer signal in a pointer register by actuating gating circuits to transfer selected output signals from the first register and the offset register, whereby said pointer register has a pointer formed within it for locating the new segment in the available partition in the existing page frame which also contains the existing segment.

3. Apparatus as defined in claim 2, also comprising means for sensing an input indicator that the new segment is to be a variable length segment and conditioning a sixth output signal, gating circuits for connecting a signal source providing a signal for locating the last partition in a page frame when said fifth output signal or said sixth output signal indicates said new segment is a large segment or is a variable segment.

4. Apparatus as defined in claim 3 further comprising a generator of segment group identifier signals which partly identify segments connected to an output of said comparator and an output of said AND circuits to generate a next segment group identifier signal when the output of said comparator or the output of said AND circuits provide a no packing signal or a no-partition-available signal, a header register for generating a header for a new page frame when said generator is actuated, gating means to a header register for initially setting on a packing bit position and setting off availability flags in the header register, setting a partition offset register to a location of the first partition in said page frame if electrical indicators sense the size of the new segment is less than or equal to one partition and the new segment is fixed, but setting said offset register to a location of the last partition if said new segment is variable or large, and means for actuating said forming and storing means.

5. A method for controlling the operation of page frame hardware components in a main store for partitioning said page frame hardware components in order to pack therein a plurality of segments in response to execution of a create segment instruction in a computer system, comprising the steps of electrically gating to a first test circuit a content of an affinity operand of said create segment instruction; said test circuit conditioning a first line to signal a packing indication if said affinity operand contains a locator of a first page of an existing segment for which packing is indicated, but said test circuit conditioning a second line if no packing is indicated by said affinity operand, if said first line is conditioned, accessing the page frame located by said affinity operand through a dynamic address translation mechanism, transferring a flag word for said page frame into a local register, and checking the electrical state of a packing bit in said flag word in a checking circuit to electrically condition a third line if said packing bit indicates said page frame is packable, but said checking circuit conditioning a fourth line if said packing bit indicates said page frame is not packable, then gating to a second test circuit a size-characteristic operand of said instruction; said test circuit conditioning a fifth line if the operand indicates the new segment is to be fixed, but conditioning a sixth line if the operand is found to indicate the new segment is to be variable, also gating a size operand of said instruction to the first test circuit, which conditions a seventh line if the size operand indicates the new segment size is equal or less than one partition, but conditions an eighth line if the size operand indicates the new segment size is greater than one partition and has a packable length not greater than a maximum segment size less one page frame size less one partition size, but conditioning a ninth line if said size operand indicates the segment is to large to be packable, If said seventh line is conditioned, scanning the electrical state of availability flag bits in said flag word for indicating an available partition in said page frame, and conditioning a tenth line if any available partition is indicated; but if said eighth line is conditioned, checking the electrical state of an availability flag bit for the last partition and conditioning an eleventh line; but if said scanning step finds the electrical state of all availability flag bits indicate no partition is available, conditioning a twelfth line setting a partition offset register to a partition offset for locating said available partition in response to the conditioning of said seventh or said eighth lines, and forming a delineator and locator for said new partition and segment in a sink operand of said instruction by gating into said sink operand a segment group identifier content from said affinity operand and the partition offset from said partition offset register.

6. A method as defined in claim 5 further including steps of generating a segment group identifier signal by conditioning any of said second, fourth, ninth or twelfth lines, the new segment group identifier signal being used to identify a new segment in relation to another page frame, locating the new segment in the first partition of said another page frame by the conditioning of said second, seventh or ninth lines; but locating said segment in the last partition of said another page frame by the conditioning of the fourth or twelfth line, providing a new flag word for said another page frame by setting off a packing bit position in a register in which said flag word is formed, and setting off an availability flag bit position in said register for the first partition in said another page frame by the conditioning of said second, seventh or ninth lines; but setting on said packing bit position and setting off an availability flag bit position for the last partition in said another page frame by the conditioning of said fourth or twelfth lines, and actuating said forming step.

7. Apparatus for locating a segment which may be packed with other segments in a page frame hardware component in a main store of a computer system, comprising a pointer register for containing a segment address to locate a segment in the computer system, the pointer register including a partition offset section, a segment page section, and a segment displacement section, an adder circuit, first means for gating to said adder circuit a content of said segment page section and a content of said segment displacement section, and second means for gating a content of the partition offset section to said adder circuit in alignment with a high order end of the content of the segment displacement section, and a virtual address register connected to an output of said adder circuit to receive page and displacement parts of a virtual address for locating the segment in a page frame hardware component, the virtual address register having a virtual page frame section and a virtual displacement section which receives the page and displacement parts.

8. A method for locating a segment which may be packed with other segments in a page frame hardware component in a main store of a computer system, comprising the steps of gating into an adder circuit contents of a partition offset section, a segment page section, and a segment displacement section of a pointer register, said gating step aligning the gated content from the partition offset section with the gated higher order end of the content of the segment displacement section, connecting the output of the adder circuit to a virtual address register for providing in the virtual address register a virtual address for locating the segment in a page frame, the virtual address register having a virtual page frame section.

9. Apparatus for locating a segment which may be packed with other segments in a page frame hardware component in a main store of a computer system, comprising a pointer register for containing a segment address to locate a segment in the computer system, the pointer register including a partition offset section, a segment page section, and a segment displacement section, an adder circuit, first means for gating to said adder circuit a content of said segment page section and a content of said segment displacement section, and a second means for gating a content of the partition offset section to said adder circuit in alignment with a high order end of the content of the segment displacement section, and a virtual address register connected to an output of said adder circuit to receive page and displacement parts of a virtual address for locating the segment in a page frame hardware component, the virtual address register having a virtual page frame section and a virtual displacement section which receives the page and displacement parts, third means for gating into the virtual address register a content of segment group identifier section also included in the pointer register as part of the virtual address corresponding to the segment address contained in the pointer register, an index register for receiving and providing an index content which is to modify a segment address to locate an internal part of the segment, means for connecting the output of said index register to an input of said adder circuit, whereby said virtual address register receives a virtual address of the internal part of said segment, a dynamic address translation mechanism for providing an output containing a page frame address in the main store for said segment in a page frame component, gate circuit means for transferring an output of the virtual address register to the dynamic address translation mechanism, a storage address register for receiving the output of said dynamic address translation mechanism, a decoder circuit connected to said storage address register for accessing the page frame component in said main store containing the segment, a store data register receiving a header accessed at the beginning of the page frame located by the store address register, a header register, and means for gating the header in said store data register into said header register.

10. Apparatus as defined in claim 9 further comprising a comparing circuit for checking the virtual address in relation to a partition boundary, first means for gating the content of the partition offset section of the pointer register into said comparing circuit, second means for gating into the comparing circuit the content of the virtual page frame section and a high order part of the virtual displacement section of the virtual address register, the high order part having the same number of bit positions as the partition offset section, a first output circuit connected to the comparing circuit for receiving an equal signal generation by said comparing circuit, an access conditioning gate circuit connected between the first output circuit and the store data register to condition the store data register for outputing its content, a second output circuit connected to the comparing circuit for receiving an unequal signal generated by said comparing circuit to condition interrupt hardware in the data processing system to signal an addressing error.

11. A method for locating a segment which may be packed with other segments in a page frame hardware component in a main store of a computer system, comprising the steps of gating into an adder circuit contents of a partition offset section, a segment page section, and a segment displacement section of a pointer register, said gating step aligning the gated content from the partition offset section with the gated higher order end of the content of the segment displacement section, connecting the output of the adder circuit to a virtual address register for providing in the virtual address register a virtual address for locating the segment in a page frame, the virtual address register having a virtual page frame section, also connecting an index register to an input of said adder circuit for generating a virtual address to locate an internal part of the segment, transferring an output of said adder circuit to the virtual address register for providing the page and displacement parts of the virtual address for the internal part of said segment, also transferring a content of a segment group identifier section of the pointer register into a segment group identifier section of the virtual address register to complete the virtual address, gating a content of said virtual address register to a dynamic address translation mechanism to obtain a page frame address for the page frame component in said main store containing the internal part of the segment, connecting the output of the dynamic address translation mechanism to a storage register and a decoder circuit in the main store, outputting a header contained in the page frame component into a store data register, and gating the header from said store data register into a header register.

12. A method as defined in claim 11 further comprising the steps of also gating into a comparing circuit the virtual page frame section and a high order part of a virtual displacement section of the virtual address register, further gating into said comparing circuit a content of the partition offset section of said pointer register, the higher order part and the partition offset section having the same number of bit positions, connecting an equal output signal from the comparing circuit to a first output circuit, access conditioning the output of said main store with a signal from the first output circuit, and actuating an input to interrupt hardware with a signal from an unequal output of said comparing circuit to indicate an addressing error.

* * * * *